US008126788B2

(12) United States Patent
Pappas et al.

(10) Patent No.: US 8,126,788 B2
(45) Date of Patent: Feb. 28, 2012

(54) METHOD FOR TRACKING TIME ATTENDANCE OF EITHER A DEDICATED USER OR MULTIPLE NON-DEDICATED USERS, INTERCHANGEABLY, USING A SINGLE MULTI-FUNCTION ELECTRONIC HAND-HELD DEVICE

(75) Inventors: Anthony H. Pappas, Woodland Hills, CA (US); Thomas F. Bulatewicz, Jr., Manhattan, KS (US)

(73) Assignee: Exaktime Innovations, Inc., Calabasas, CA (US)

( * ) Notice: Subject to any disclaimer, the term of this patent is extended or adjusted under 35 U.S.C. 154(b) by 2 days.

(21) Appl. No.: 12/128,846

(22) Filed: May 29, 2008

(65) Prior Publication Data

US 2008/0296364 A1 Dec. 4, 2008

Related U.S. Application Data

(60) Provisional application No. 60/940,506, filed on May 29, 2007.

(51) Int. Cl.
*G06F 15/02* (2006.01)

(52) U.S. Cl. .............................. 705/32; 705/1.1; 705/30

(58) Field of Classification Search .................. None
See application file for complete search history.

(56) References Cited

U.S. PATENT DOCUMENTS

| | | | |
|---|---|---|---|
| 5,068,787 A | 11/1991 | Pipella et al. | |
| 5,717,867 A | 2/1998 | Wynn et al. | |
| 5,842,181 A | 11/1998 | Fanjoy | |
| 5,877,953 A * | 3/1999 | Clendenen et al. | 700/17 |
| 5,956,696 A | 9/1999 | Guryel | |
| 5,991,742 A | 11/1999 | Tran | |
| 6,078,255 A | 6/2000 | Dividock et al. | |
| 6,304,851 B1 * | 10/2001 | Kmack et al. | 705/11 |
| 6,751,650 B1 * | 6/2004 | Finch et al. | 709/203 |
| 7,069,498 B1 | 6/2006 | Finch, II et al. | |
| 7,099,236 B2 | 8/2006 | Yamagishi | |
| 7,185,807 B1 * | 3/2007 | Robinson et al. | 235/382 |
| 2002/0175211 A1 | 11/2002 | Dominquez et al. | |
| 2003/0061159 A1 * | 3/2003 | Adams et al. | 705/40 |
| 2003/0088534 A1 * | 5/2003 | Kalantar et al. | 706/50 |
| 2004/0019542 A1 * | 1/2004 | Fuchs et al. | 705/32 |
| 2005/0021428 A1 | 1/2005 | Costello | |
| 2005/0177477 A1 | 8/2005 | Arghavanifard et al. | |
| 2006/0146649 A1 | 7/2006 | Pappas et al. | |

OTHER PUBLICATIONS

Data maxx Technologies, Inc., Copyright 2003, Data Maxx Techologyies Inc. Palm, Palm OS, Dm_palm_102103 rev 1021031.*

* cited by examiner

*Primary Examiner* — Ryan Zeender
*Assistant Examiner* — Fateh Obaid
(74) *Attorney, Agent, or Firm* — Kelly & Kelley, LLP

(57) ABSTRACT

A method for tracking time attendance for either a single dedicated user, and typically owner, of a single multi-function electronic hand-held device without the need of entering password information, or selectively interchangeable to multiple non-dedicated users which must enter passwords to access their time tracking screens is provided. The time tracking software on the hand-held device can be placed into solo mode for a single dedicated user, which can be selectively deactivated so as to enable multiple non-dedicated users to enter their passwords to log in and clock-in or clock-out. The solo mode may be selectively reactivated so as to automatically log in the dedicated user and display his or her time tracking screen. An authorized administrator's password may be necessary to activate or deactivate solo mode.

16 Claims, 5 Drawing Sheets

METHOD FOR TRACKING TIME ATTENDANCE OF EITHER A DEDICATED USER OR MULTIPLE NON-DEDICATED USERS, INTERCHANGEABLY, USING A SINGLE MULTI-FUNCTION ELECTRONIC HAND-HELD DEVICE

BACKGROUND OF THE INVENTION

The present invention generally relates to time keeping apparatuses, such as time clocks and the like. More particularly, the present invention relates to a method for tracking time attendance of either a single dedicated user or alternatively, multiple non-dedicated users, in a selectively interchangeable manner, using a single multi-function electronic hand-held device, such as a personal digital assistant or cell phone.

It is common for employees to "clock-in" and "clock-out" when checking in and checking out of work, such as when arriving at work, taking a lunch break and leaving for the day. Traditionally, a separate time clock or piece of equipment is used with an electronically swiped card, or a clock used to record the time entry, or punch numbers or holes on so-called punch cards. In other instances, makeshift charts are made where one must input his or her own date and time when clocking in and clocking out.

In these time sheet and time clock systems, an intermediary must transfer data recorded by the employees to other areas of the payroll system. These transfers are time consuming and increase the likelihood of errors in the data. Moreover, paper time sheets and punch cards can be lost, raising questions as to the actual number of hours worked.

In some work environments, such as a construction jobsite or other employment situations wherein the employees are traveling from jobsite to jobsite, it is difficult to monitor when employees check in and check out or are performing certain tasks. This is due to the fact that such work sites are often outdoors and not conducive to the traditional time clock apparatuses. A company can lose thousands of dollars per year when employees arrive fifteen minutes late and leave fifteen minutes early, but do not reflect it on the written time sheets.

More recently, computer-based time keeping systems have been implemented. These computer-based time keeping systems, however, are usually permanently installed at a work site. Furthermore, there is required an interconnectivity between the various computer-based time keeping apparatuses. For example, Arghavanifard et al. (U.S. Publication No. 2005/0177477) discloses a multi-user computer software time attendance tracking system, wherein the software is accessed at the individual worker's computer work stations, which has been transferred to a central computer for calculating the hours worked, benefits, etc. While eliminating the problems associated with paper time sheets and punch cards and the like, this system presents its own drawbacks with respect to those workers who are mobile and move from jobsite to jobsite.

U.S. Pat. No. 7,298,673 to Pappas et al. discloses a time attendance system designed to be used in harsh conditions, such as outdoor jobsites. The time attendance system utilizes portable touch buttons which are brought into contact with the time attendance clock placed at the jobsite. Periodically, the time attendance records are extracted and downloaded from the time attendance clocks and brought to a central processor. This system enables the accurate time keeping of multiple employees at multiple jobsites. However, there are various drawbacks to this system as well. There must be at least one time attendance clock at each given jobsite. Moreover, each of the workers must know the location of the time attendance clock at each location and physically present themselves at that location to clock-in and out. Some jobsites can be fairly large, requiring either that the worker take time to travel from his or her location to the time attendance clock, or the employer place multiple time attendance devices throughout the jobsite. Another potential problem is that the time attendance devices are operated by batteries, and in the event the battery runs out of power, the time attendance device is unable to record time attendance records. Also, there is the chance that the time attendance device may fail to function.

U.S. Publication No. 2002/0175211 to Dominquez et al. discloses a time and attendance system and method for monitoring employees at remote work sites, such as construction sites. Dominquez et al. disclose one or more portable recording devices, which include means for identifying the geographic location of the device, a digital camera for capturing a visual image of the employees upon each such event, a keypad for the employee's entry of an I.D. upon clocking into or out of a work site, as well as a display. It will be appreciated by those skilled in the art that the creation and installation of such devices would be very expensive. Moreover, these devices would suffer the same drawbacks as the Pappas et al. devices described above.

U.S. Publication No. 2005/0021428 to Costello discloses a time management system for mobile employees. The mobile employees, in communication with the system web server via a cell phone or PDA, enter time transaction data using the mobile computing device's web browser. Based upon the employee's predefined profile, custom web pages are presented requesting employee's specific time transaction information. The employee must enter a screen name and password using the mobile phone keypad to gain access to the secured server with the time keeping software. Moreover, once logged-on, the employee must select the appropriate activity and client from scrolling menus displayed on the mobile computing device's screen to enter time-related information or to receive information stored on the server regarding a task performed. This is a multi-step process which is time consuming and can be aggravating. Moreover, Costello does not disclose the use of such a device in association with multiple employees, but rather specifically states that the system protects against unauthorized access of data by having defined administrative user privileges. Yet another potential problem is that the mobile telephone device must have access to the internet in order to access the time tracking software on the web server. In certain geographical areas, such access is simply not available.

There are situations, such as in the construction industry, where individuals travel from jobsite to jobsite. Moreover, often times these individuals charge different rates either for the different job or activity which they are conducting at the time. For example, the individual may charge one hourly rate for travel time between jobsites, another hourly rate for foundation work, and yet another hourly rate for framing. There also exists the need for the individual to not only conveniently track the time for each of these for himself, but also for others. For example, there exists the possibility that a foreman, supervisor or the like may arrive at a jobsite and find that the time attendance device is not functioning, has been damaged due to vandalism, or even stolen. In such a case, it would be highly desirable for the supervisor, foreman, etc. to be able to not only track his or her time, but also track the time of the employees at that jobsite.

Accordingly, there is a continuing need for a time attendance tracking system for one or more employees which tracks the mobile employees between various jobsites and when they perform various duties. The present invention fulfills these needs, and provides other related advantages.

SUMMARY OF THE INVENTION

The present invention relates to a method for tracking time attendance for either a single dedicated user or multiple non-dedicated users, in a selectively interchangeable manner. A multi-function hand-held device is used to track the time attendance. In a particularly preferred embodiment, the multi-function hand-held electronic device comprises a personal digital assistant device or a cell phone which is carried by the user and used for other functions as well as a time attendance tracking device. Typically, the device will include Palm™ operating system software installed thereon. A time tracking software application embodying the present invention is installed on the multi-function hand-held device so as to be operable with the Palm™ operating system software.

As the unit owner of the PDA or cell phone uses the device for multiple functions, the time tracking software must be selected or activated, such as through a menu or the like as is well known in the art. The time tracking software then automatically determines if it is in a solo mode dedicated to a single user of the hand-held device. If the time tracking software is in the solo mode, the dedicated single user is automatically logged in and a time tracking screen of the dedicated user is automatically displayed, enabling the dedicated user to clock-in or clock-out.

However, if the time tracking software determines that it is not in a solo mode dedicated to a single user of the hand-held device, a password screen is displayed. Each employee then enters a password on the password screen to log in. The time tracking software displays a time tracking screen for each non-dedicated user which has logged in, enabling the user to clock-in or clock-out.

In accordance with the present invention, if the time tracking software is not in the solo mode, the solo mode may either be activated or reactivated for a dedicated user, resulting in the dedicated user being automatically logged in and the time tracking screen for the dedicated user displayed. However, if the time tracking software is in the solo mode, and it is desired to deactivate the solo mode so that multiple employees or users can clock-in and clock-out, the solo mode is selectively deactivated and a password screen is displayed enabling the dedicated user or non-dedicated users to enter their passwords to log in and clock-in or clock-out.

In one embodiment of the present invention, an authorized administrator is required to deactivate the solo mode. Thus, the time tracking software determines if an entered password is of an authorized administrator. If so, the time tracking software permits the activation of the solo mode. However, the time tracking software will not permit the activation of the solo mode if it is determined that the entered password is not of an authorized administrator.

Similarly, an authorized administrator may be required to activate or reactivate the solo mode. Once again, the time tracking software determines if the entered password is of an authorized administrator. If not, activation of solo mode is not permitted. However, if an authorized administrator enters his or her password, the time tracking software will permit the authorized administrator to activate the solo mode. Typically, a list of registered employees is displayed, and the authorized administrator selects an employee from the list to be the dedicated user in solo mode for that particular hand-held device.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
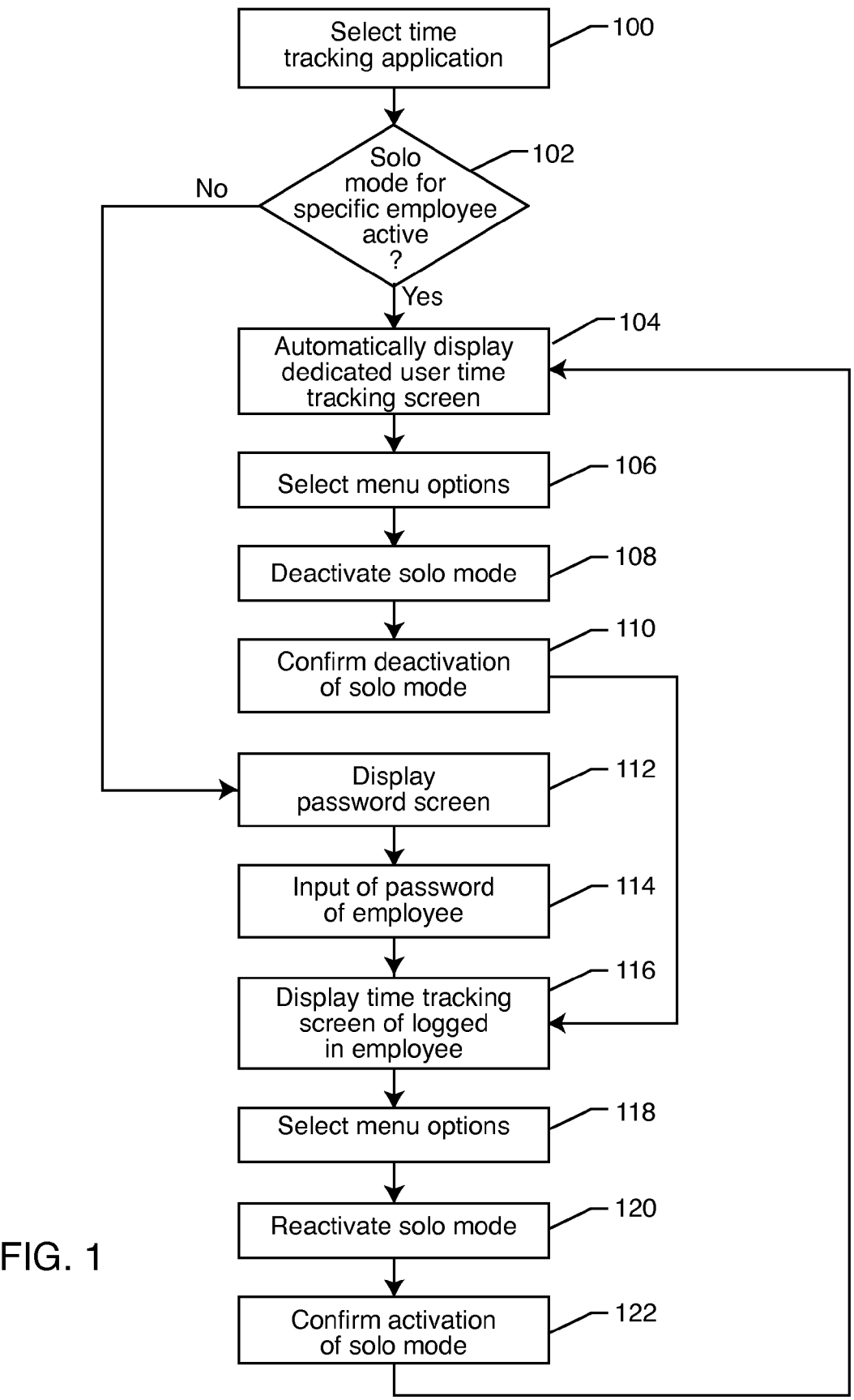
FIG. 1 is a flowchart depicting the steps taken in accordance with the present invention.

As shown in the accompanying drawings, for purposes of illustration, the present invention resides in a method for tracking time attendance. More particularly, the present invention resides in a method for tracking time attendance for either a single dedicated user of a multi-function electronic hand-held device, or which can be interchanged to track the time attendance of multiple non-dedicated users.

The present invention is in the form of a software application which is included or downloaded onto a hand-held electronic device. The time tracking software of the present invention is particularly suited for operation with the Palm™ operating system software. Multi-function electronic hand-held devices which include the Palm™ operating system include various Personal Digital Assistants (PDA) and cell phones, such as the Palm Treo Smartphone™. Thus, the hand-held device is multi-function in the sense that it serves as a PDA, cell phone, or the like so as to be personal to the owner or user thereof, and serve as other functions such as operating as a telephone, an address book, supporting other software applications, and the like. As is well know, such PDAs or smart phones include digital screens and keyboards and/or interactive visual display screens which are activated by hand-held wands or pointers or the like. The Palm Personal Digital Assistant and the Palm Treo Smartphone™ are particularly well suited for the present invention at this time. However, other mobile telephones and PDAs which include a display screen, data entry inputs, and which can accept downloaded software applications could support the present invention as well. Thus, although the software system of the present invention is preferably Palm™ based, it will be appreciated that the operability could be changed so as to be used in association with other hand-held electronic devices. For example, the present invention is also suitable for Windows Mobile devices as well. Of course, over time, other operating systems may be used by such devices. The important aspect is that the hand-held device is completely portable, and can have the software application of the present invention implemented therein. The hand-held device must include a display screen, an input mechanism so as to control the software and track the individual, jobsite, and cost code or event.

The software application of the present invention is adaptable to store a large number of different employees, cost codes, job activities, jobsite locations and the like. Preferably, the present invention is adaptable such that new employees can be added, jobsite locations added or deleted as needed, by either an authorized administrator or the holder or owner of the hand-held electronic device.

In a particularly preferred embodiment, the multi-function hand-held electronic device, typically in the form of a PDA or cell phone, is "dedicated" to an individual, that is, the owner or user of the device. For example, when somebody carries a Treo Smartphone, they typically don't share their phone with others. This is due to the fact that not only is the hand-held device expensive, but also is personalized to the user in that it contains his or her personalized data in the form of address book contacts or telephone numbers and addresses, screen savers, photos, etc. Also, making telephone calls or the like can incur charges which might be the responsibility of the owner or dedicated user of the device.

In such a case, it has been found that time tracking software which is operable on such a device and which requires the user to not only open the application, but subsequently enter a password or identification code in order to access the time tracking software and clock-in or out or access menu options becomes not only time consuming, but an aggravation. As will be more fully described herein, the present invention enables the owner of the hand-held device, or an authorized administrator, to enter into a solo mode such that the time tracking software on that particular hand-held device is dedicated to that user and does not require the step of entering the identification code or password each time the user clocks in and out, selects a jobsite, an event that is to be performed, cost code, etc. However, as will be more fully described herein, either the owner or user of the hand-held device or an authorized administrator can deactivate the solo mode such that other employees can clock-in and out using the hand-held device by entering their identification codes or passwords. In the solo mode, the dedicated user is immediately and automatically presented with a time tracking screen, and can immediately access the time tracking features of the software that is intended for him or her. In the multi-user mode, such screens are presented after entering the individual's identification code or password.

Figure 5:
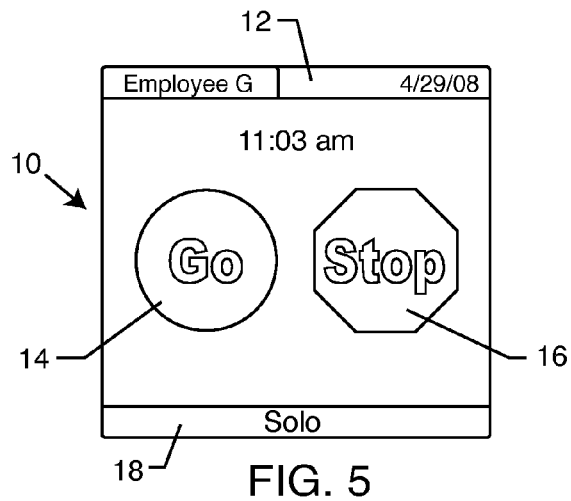
FIGS. 5 and 6 are screenshots illustrating the solo mode of the present invention.

With reference to FIG. 1, as the hand-held device is multi-function in nature, the time tracking application of the present invention must first be selected (100). The time tracking software then determines if the solo mode is active for a specific employee (102). If so, the dedicated user's time tracking screen is automatically displayed (104). FIG. 5 illustrates a typical screenshot which would be automatically displayed in this case. That is, the employee would be automatically logged in without having to enter his or her password or identification code. In this case, Employee G is automatically presented with a screenshot in solo mode where the employee can clock-in or clock-out. The employee would also be able to select jobsites, cost codes, and other menu items from this screen 10. This could be done by activating the upper tool bar 12. Icons, such as the Go 14 and Stop 16 icons enable the employee to clock-in and clock-out. A bar on the bottom 18 indicates that the software is running in solo mode dedicated to that user.

Figure 6:
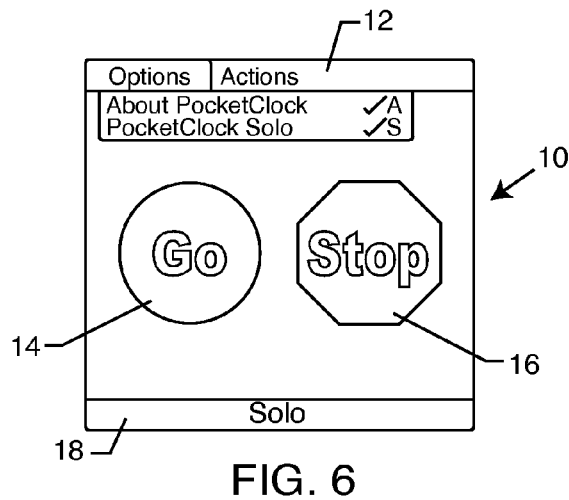
Figure 7:
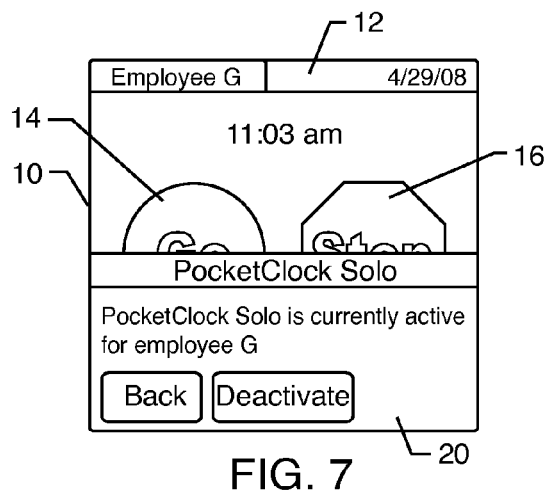
FIG. 7 is a screenshot of the present invention illustrating deactivation of the solo mode.

With reference again to FIG. 1, if the employee for whatever reason wanted to deactivate the solo mode and enter into a multi-user mode, the employee would first select the menu options (106). This is illustrated in the screenshot 20 of FIG. 6 when the employee has selected the menu options, which shows that the solo mode is active. With reference to FIGS. 1 and 7, the user then deactivates solo mode (108). With reference to FIG. 7, typically the display screen will show a message to the effect that the application is currently active in solo mode for such and such an employee, in this case Employee G. The user is then given the opportunity to go back so as not to deactivate solo mode, or to press a button or activate a link which deactivates the solo mode, as illustrated in FIG. 7.

Figure 8:
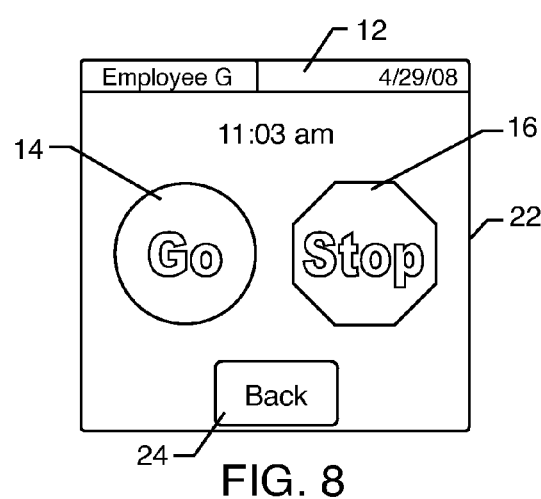
FIGS. 8-10 are screenshots of the present invention illustrating the invention operating in a multi-user mode.

With reference to FIGS. 1 and 8, deactivation of the solo mode is confirmed (110), and the application immediately displays the time tracking screen of the last logged in employee (116). FIG. 8 illustrates this new screen 22 which is not in solo mode, but instead has a "back" button 24 instead of the "solo" bar indicating solo mode being active.

Figure 4:
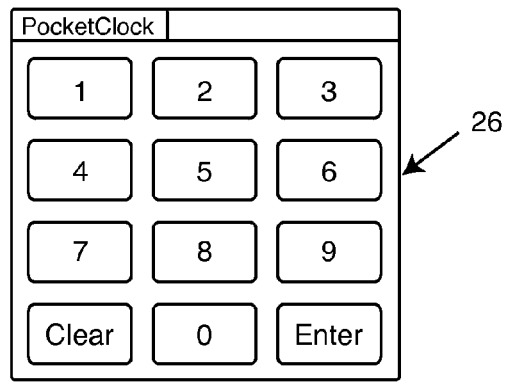
FIG. 4 is a depiction of a password screen display, used in accordance with the present invention.

With reference again to FIG. 1, if the solo mode for a specific employee is not active upon selecting a time tracking application, a password screen is displayed (112). Such a password screen 26 is illustrated in FIG. 4, and typically will include a screen activated set of numbers or a number pad which can be used to enter an identification code. It will be appreciated that the password or identification code screen could also be used in association with a keyboard and include letters and/or numbers. With reference to FIG. 8, once the solo mode is deactivated and the last logged in employee's time tracking screen displayed, selecting the "back" button 24 presents the password screen 26 of FIG. 4 so that another employee can enter his or her password in order to log in and clock-in and out, etc.

With continuing reference to FIG. 1, after the password screen is displayed (112), each employee inputs his or her password (114). For each password entered, the time tracking screen of the logged in employee is displayed (116). Thus, each employee could enter his or her password in the screen 26 of FIG. 4, which will yield a screenshot 22 similar to FIG. 8 enabling the employee to clock-in and out, select menu options for cost codes, jobsites, etc.

The above can be particularly useful for a foreman, supervisor, or the like which has a phone or PDA which incorporates the present invention. That particular employee need not enter his or her password each time he or she logs in, clocks in or out, selects a jobsite, cost code, etc. However, if that employee, foreman, etc. arrives at a jobsite and there is no time attendance tracking device, or it is broken or missing, then the foreman, supervisor, etc. can deactivate the solo mode on his or her PDA or cell phone or the like to enable other employees to log in and track their time.

In such instance, the owner of the hand-held device may want to reactivate the solo mode. With reference again to FIG. 1, the user would then select the menu options (118), and reactivate solo mode (120). The software will confirm activation of solo mode (122), and automatically display the dedicated user's time tracking screen (104).

Figure 2:
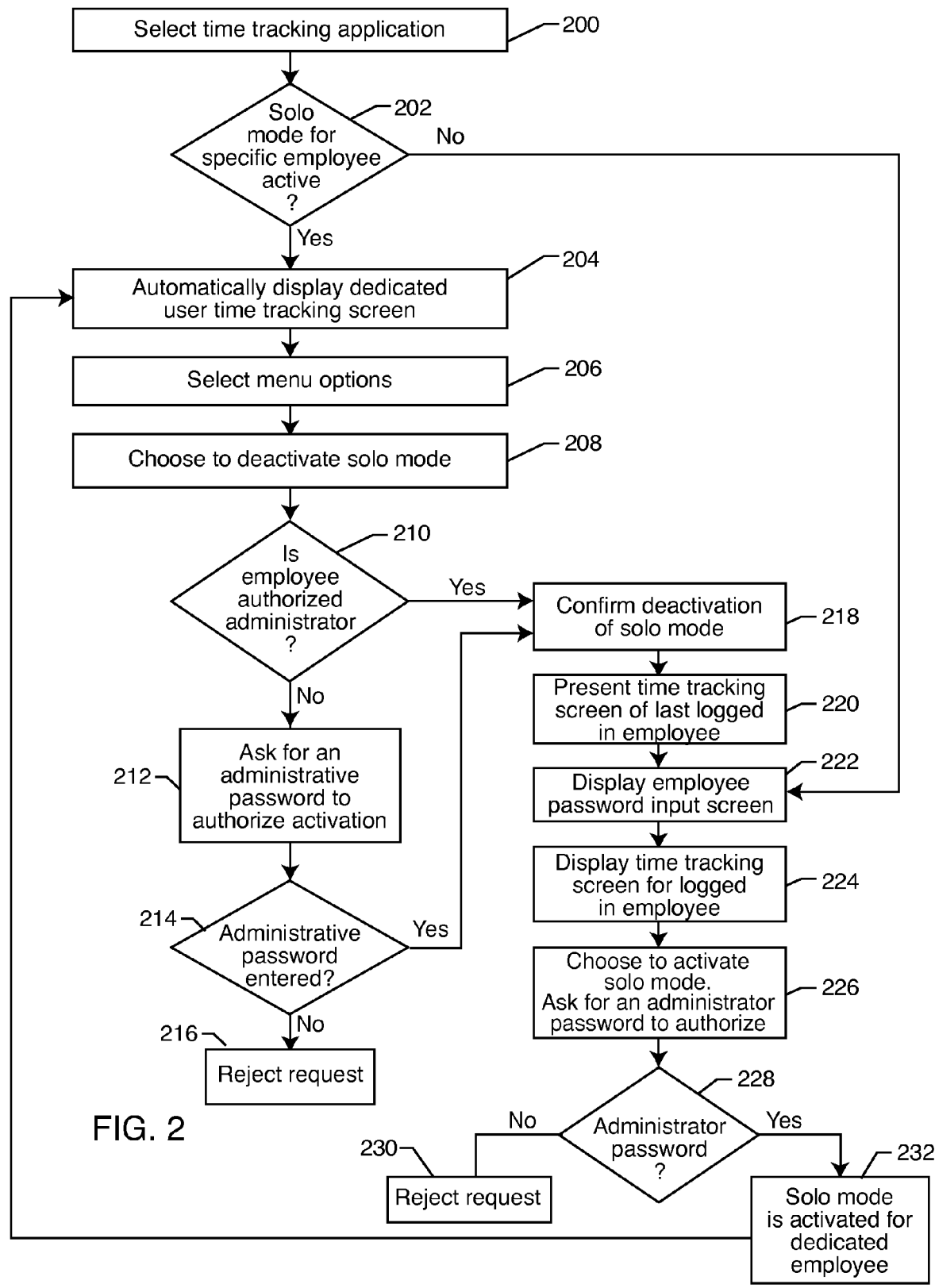
FIG. 2 is another flow chart depicting the steps taken in an embodiment of the present invention.

With reference now to FIG. 2, there are instances where it is desirable to only have an authorized administrator either activate or deactivate the solo mode. For example, a particular company may issue the hand-held PDA or cell phone device and intend that it be used to track the time of only the owner of that device and not anyone else. In other instances, the company may want to become aware of the holder of the hand-held device deactivating solo mode and allowing others to use his or her hand-held device to log in and check in or out, and thus require an authorized administrator to reactivate solo mode.

With reference now to FIG. 2, the time tracking application of the present invention is selected (200), and the application determines if the solo mode is active for a specific employee (202). If so, the time tracking screen of the dedicated user is automatically displayed (204). The menu options are selected (206), and the user chooses to deactivate solo mode (208). In the case where an authorized administrator is required to deactivate the solo mode, the application determines if the employee is an authorized administrator (210). If not, the invention will ask for an administrative password to authorize activation (212). Typically, in such case, the password screen 26 of FIG. 4 is displayed. The system then determines if an administrative password is entered (214). If the administrative password is not entered, the request is rejected (216). However, if either the dedicated user is an authorized administrator, or an authorized administrator enters his or her password, then the activation of solo mode is confirmed (218).

Figure 9:
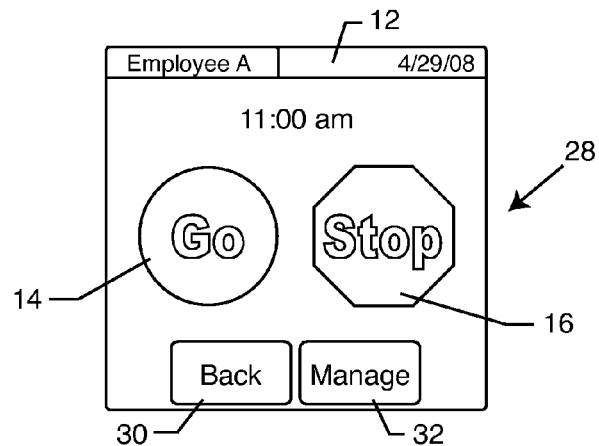
Figure 10:
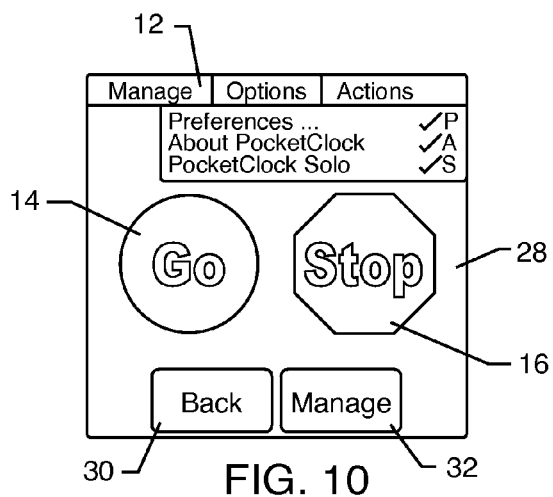

With reference now to FIG. 9, when an authorized administrator logs in, typically a screen 28 such as that illustrated in FIG. 9 is shown. In this case Employee A is the authorized administrator as indicated in the top bar 12. The authorized administrator is also presented with the clock-in 14 and clock-out buttons 16. However, in this case, the authorized administrator is also presented with additional buttons 30 and 32 which are "back" and "manage" respectively. By clicking on the "manage" button 32, the authorized administrator is presented with options, including deactivating or activating the solo mode, as illustrated in FIG. 10.

Referring again to FIG. 2, after the solo mode is deactivated, the time tracking screen of the last logged in employee is displayed (220). Other employees can log in and clock-in or out by displaying the employee password input screen (222), which is also automatically displayed if the solo mode for a specific employee was not active at the time of selecting the time tracking application and step (202). The time tracking screen for each logged in employee is displayed (224).

In the event that solo mode is to be reactivated, an administrator password must be entered in order to authorize reactivation of the solo mode in some embodiments of the present invention (226). The system then determines if the entered password or the logged in employee entered an administrator password (228). If not, the request is rejected (230). However, if an administrator's password was entered, then solo mode is activated for the dedicated employee (232), and automatically the dedicated user time tracking screen is displayed (204). Thus, the owner of the hand-held device who is an authorized administrator can switch between solo and multi-user modes, or the owner of the device who is the dedicated user of the hand-held device requests that an authorized administrator enter his or her password in order to switch between solo mode and multi-user modes.

Figure 3:
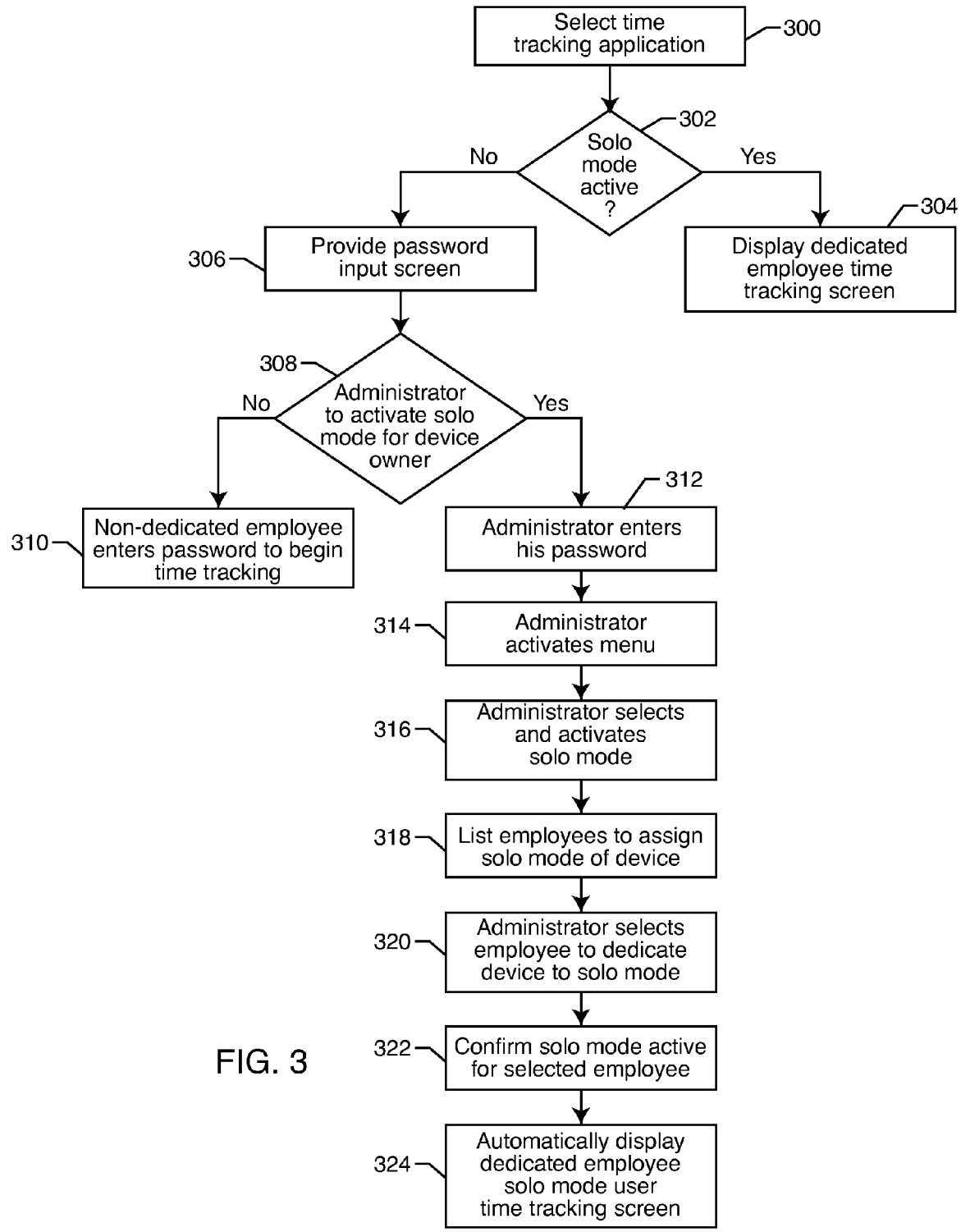
FIG. 3 is a flowchart depicting the steps taken in accordance with yet another embodiment of the present invention.

With reference now to FIG. 3, the steps taken in order to activate solo mode for a particular employee who is to be the owner or dedicated user of the hand-held device is shown. Once again, as the hand-held device is a multi-function device with many functions other than the time tracking application, the time tracking application of the present invention must be selected (300). The application of the present invention determines if the solo mode is active (302), and if so, the dedicated employee time tracking screen is automatically displayed (304).

However, if solo mode is not active, the password input screen is displayed and presented (306). It is then determined whether an administrator is needed to activate the solo mode for the device owner (308). If an administrator is not entering his or her password, then a non-dedicated employee's password is entered to begin time tracking for that particular employee (310), and the system remains in a multi-user mode.

Figure 11:
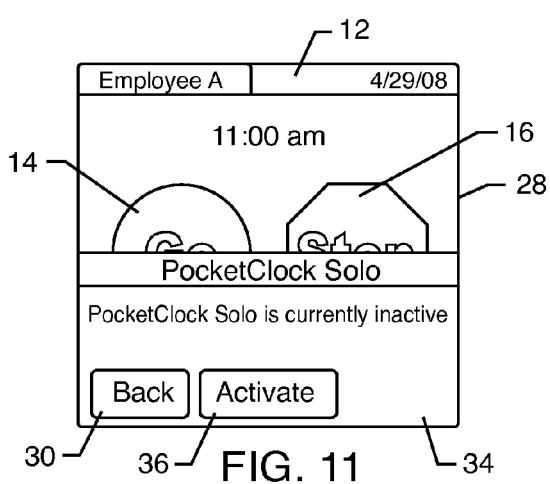
FIG. 11 is a screenshot illustrating activation of the solo mode of the present invention.

However, if the solo mode is to be activated for the device owner, the administrator enters his or her password (312). The administrator activates the menu (314), and activates solo mode (316). The screenshots 28 in FIGS. 9 and 10 illustrate the typical screen of an authorized administrator. FIG. 11 illustrates the authorized administrator's screenshot 28, and after selecting the menu for solo mode, a window 34 is presented indicating that that solo mode is not currently active, and giving the option to go back 30 or to activate 36 the solo mode.

Figure 12:
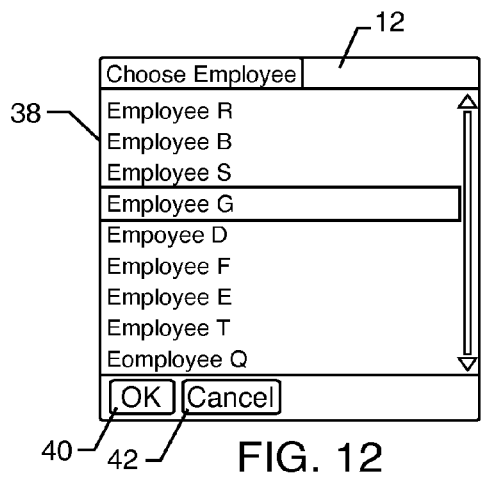
FIGS. 12 and 13 are screenshots depicting listings of employees for selection to be a dedicated user of solo mode for a particular hand-held device, in accordance with the present invention.
Figure 13:
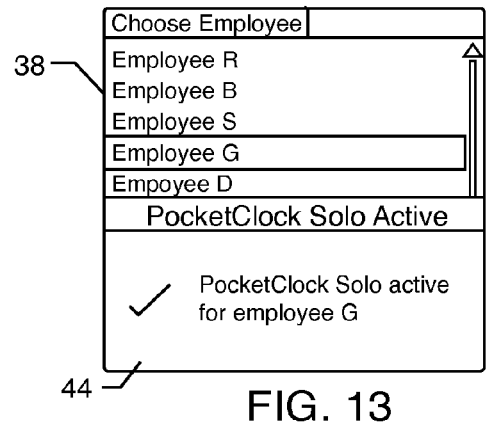

Referring once again to FIG. 3, once the administrator selects and activates the solo mode (316) a list of employees is displayed to select from to assign the solo mode of the device (318). The administrator then selects the employee to dedicate the device to the solo mode (320), and the system confirms solo mode activation for the selected employee (322). This is illustrated in FIGS. 12 and 13 wherein screenshot 38 listing the employees is shown. The authorized administrator can scroll through the list of employees and select the particular employee which is to be assigned the hand-held device and for which the solo mode is to be activated. In this case, the authorized administrator has selected Employee G by virtue of a scroll wheel, buttons on a keyboard, hand-held wand or the like which interface with the hand-held device. The authorized administrator would then click the "okay" button or the "cancel" button 42 if the authorized administrator inadvertently selected the wrong employee. With reference to FIG. 13, once the appropriate employee was selected, a window 44 would be presented indicating that the system was activated in solo mode for the selected employee, in this case Employee G.

Referring again to FIG. 3, once these steps occur, the time tracking screen for the dedicated employee to whom the solo mode has been assigned is automatically displayed (324). This would typically be presented as the screenshot 10 of FIG. 5. This is the clock-in and clock-out screen, and the employee will also have access to select jobsite, cost code, event and the like if available or necessary.

Although FIGS. 2 and 3 are directed to the scenario for the need of an administrator to activate or deactivate the solo mode, it will be appreciated that in some instances this may be undesirable. Thus, as illustrated and explained in FIG. 1, an administrator need not necessarily be used. However, in such instances, it would be most desirable that only the owner or user of the mobile device be able to activate or deactivate the solo mode. That is, preferably, only the owner or user of the particular mobile device could activate the solo mode for himself or herself for that particular device. The owner of the device could not activate the solo mode for another person using that device.

Typically, it is the hand-held device which tracks and stores all of the time attendance records for the dedicated user and/or multiple users. Such records are periodically downloaded to a laptop computer, desktop computer or the like wherein the records can be processed, such as that described in U.S. patent application Ser. No. 11/697,368 or United States Publication No. 2006/0146649, the contents of which are hereby incorporated by reference. Of course, the present invention also contemplates that the individual time attendance records created over the course of a day could be wirelessly transmitted over a network or the like to a central computer or processor which would then process the time records as needed.

It is also contemplated that the present invention be used in conjunction with GPS technology to automatically record the exact location of workers when they clock-in and clock-out using the hand-held device. The hand-held device, in the form of a PDA, cell phone, or the like would have the software application of the present invention in conjunction with GPS software installed thereon. Whenever an employee clocks in or clocks out, the software would also record the exact GPS location, so that the company or employer would know that the clock-in/clock-out was done while the employee was on the particular site in question. This information could be interfaced with time attendance processing software which could pull up maps to graphically show the employer where each worker clocked in and clocked out at any given time. An allowable perimeter could also be established around each jobsite so as to monitor whether the employee was within the perimeter when they clocked in and clocked out, without requiring the employer to look at a map to determine this. If the employee clocked in or out outside of the allowed perimeter, then a notification or warning could be given to the employer or individual processing the time records.

It will be appreciated by those skilled in the art that the present invention provides a large degree of flexibility and convenience to a mobile worker having a hand-held device such as a PDA or telephone which would support the application of the present invention. The ability to switch between a "solo" or single-user mode and a multi-user mode presents many advantages over the prior art.

Although several embodiments have been described in detail for purposes of illustration, various modifications may be made without departing from the scope and spirit of the invention. Accordingly, the invention is not to be limited, except as by the appended claims.

What is claimed is:

1. A method for selectively tracking time attendance for either a single dedicated user or multiple non-dedicated users, interchangeably, using a single multi-function electronic hand-held device, comprising the steps of:
providing a time tracking software application installed on the multi-function hand-held device;
using the hand-held device to activate the time tracking software;
determining if the time tracking software is in a solo mode dedicated to a single user of the hand-held device;
if the time tracking software is not in the solo mode and one or more non-dedicated users need to use the hand-held device to clock-in or clock-out:
a) displaying a password screen on the hand-held device;
b) each non-dedicated user entering a password using the hand-held device to log in;
c) confirming the password with a list of non-dedicated user passwords electronically stored on the hand-held device;
d) enabling each logged in non-dedicated user to clock-in or clock-out using the hand-held device; and
e) electronically storing each non-dedicated user clock-in and clock-out event on the hand-held device;
if the time tracking software is in the solo mode and the dedicated user needs to clock-in or clock-out:
a) automatically logging the dedicated single user in; and
b) enabling the dedicated user to clock-in or clock-out using the hand-held device; and
c) electronically storing each dedicated user clock-in and clock-out event on the hand-held device; and
if the time tracking software is in the solo mode and one or more non-dedicated users need to clock-in or clock-out:
a) using the hand-held device to selectively deactivate the solo mode;
b) enabling the non-dedicated users to enter their passwords to log in using the hand-held device;
c) enabling the logged in non-dedicated users to clock-in or clock-out using the hand-held device; and
d) electronically storing the non-dedicated users clock-in and clock-out events on the hand-held device.

2. The method of claim 1, wherein the multi-function hand-held device comprises a personal digital assistant or a cell phone.

3. The method of claim 2, wherein the providing step includes the step of installing the time tracking software on the multi-function hand-held device so as to be operable with Palm operating system software.

4. The method of claim 1, wherein the selectively deactivating the solo mode step includes the step of requiring an authorized administrator to deactivate solo mode.

5. The method of claim 4, including the step of determining if an entered password is of an authorized administrator.

6. The method of claim 5, including the step of permitting deactivation of solo mode if it is determined that the entered password is of an authorized administrator.

7. The method of claim 5, including the step of not permitting deactivation of solo mode if it is determined that the entered password is not of an authorized administrator.

8. The method of claim 1, including the step of selectively activating the solo mode if it is determined that the time tracking software is not in solo mode, including the step of requiring entry of an authorized password.

9. The method of claim 8, including the step of determining if an entered password is of an authorized administrator.

10. The method of claim 9, including the step of permitting activation of solo mode if it is determined that the entered password is of an authorized administrator.

11. The method of claim 1, including the step of dedicating the hand-held device to a user, including the steps of displaying a list of registered employees, and an authorized administrator selecting an employee from the list to be the dedicated user in solo mode for the hand-held device.

12. The method of claim 9, including the step of not permitting activation or reactivation of solo mode if it is determined that the entered password is not of an authorized administrator.

13. The method of claim 6, wherein the authorized administrator is the dedicated user.

14. The method of claim 10, wherein the authorized administrator is the dedicated user.

15. The method of claim 1, including the step of the logged in user inputting data relating to the job location.

16. The method of claim 1, including the step of the logged in user inputting data relating to the job activity.

* * * * *